Patented Aug. 4, 1931

1,816,845

UNITED STATES PATENT OFFICE

EARLE ATHERTON HARDING, OF LA SALLE, NEW YORK, ASSIGNOR, BY MESNE ASSIGNMENTS, TO THE ROESSLER & HASSLACHER CHEMICAL CO., OF NEW YORK, N. Y., A CORPORATION OF DELAWARE

MANUFACTURE OF ORGANIC CHLORIDES

No Drawing.  Application filed December 31, 1924. Serial No. 759,106.

This invention relates to the manufacture of organic halides such as are commonly manufactured with the aid of the corresponding halogen acids, and has for its object to render the process cheaper and more convenient. This application is a continuation in part of my application Serial Number 583,141, filed August 21, 1922, entitled Manufacture of halide compounds.

Hitherto organic chlorides have been commonly made by treating the corresponding alcohol with hydrochloric acid in the presence of zinc chloride. This process, however, is not wholly satisfactory on account of the low yield of ethyl chloride obtained, and the undesirable formation of by-products such as ethers formed when one molecule of water is abstracted from two molecules of an alcohol.

I have discovered that chlorine derivatives of organic compounds can be conveniently and cheaply made by reacting the corresponding hydroxy compounds with hydrated metallic chlorides, such as ferric chloride. The process involves a group reaction and is therefore applicable to various substances, particularly ethyl and methyl alcohols and other aromatic or aliphatic alcohols, but will be described herein by way of example only with reference to the production of ethyl chloride from ethyl alcohol, ferric chloride and water, with or without hydrochloric acid.

Ethyl alcohol, ferric chloride and water are brought together in proper proportions. It is known that ethers are formed from alcohols by treating with dehydrating agents. Anhydrous ferric chloride is known as a powerful dehydrating agent. I have found that hydrated ferric chloride reacts smoothly with alcohols to form the corresponding chlorides and ferric hydroxide without dehydrating them to form ethers. Ethyl alcohol boils at 76° C., ethyl chloride boils at 12° C., and are therefore easily separated. Temperature control is easy, and separation of the ethyl chloride is accomplished by the simplest form of distillation. At the end of the reaction there is left a residue of hydrated ferric chloride, water and ferric hydroxide.

The sludge of hydrated ferric chloride and hydrated ferric hydroxide left at the end of the run can be treated with HCl and ferric hydroxide reconverted to hydrated ferric chloride to be used in another run. An alternative procedure consists in having HCl present at the beginning of the run so that ferric hydroxide formed by the reaction of hydrated ferric chloride with alcohol will be immediately reconverted to hydrated ferric chloride. By operating in this manner I can avoid the formation of insoluble sludges in the reaction mixture and can increase the length of the run.

I find the conversion of alcohol to ethyl chloride is high and the labor costs are low, and there is a negligble depreciation of the equipment, with the added advantage that there are no side reactions to produce impurities that cannot be easily separated from the ethyl chloride.

The following examples will illustrate how my process may be used:

Example A

The reaction kettle may hold 100 gallons, may be heated by a steam jacket and otherwise designed for intermittent use. It may be connected to a simple form of refluxing equipment, scrubbing towers and final condenser. The refluxing equipment returns alcohol to the kettle. The scrubbing towers remove traces of alcohol and other volatile or entrained impurities. The kettle is filled with the mixture of alcohol, water and ferric chloride and is then heated to about 80° C.; the refluxing equipment is held at about 20° C., and the final condenser is held at a temperature low enough to recover all of the ethyl chloride. The last few percent of the product is driven off at temperatures above 100° C. I find that a good mixture to put in the kettle is that of ethyl alcohol, water and ferric chloride in ratios by weight of approximately 16 to 11 to 73.

Theoretically, to convert sixteen parts of ethyl alcohol to ethyl chloride should require only about 18.3 parts of ferric chloride. By reason of the excess of ferric chloride used, together with the fact that it is sufficiently hydrated to prevent its being too active a dehydrating agent, a smooth, rapid and complete conversion of the alcohol is assured.

*Example B*

With the same equipment as given in Example "A" the kettle may be filled ⅔ full with a hot solution of HCl, which is nearly saturated with ferric chloride. The temperature is maintained at 80° C. or higher, and alcohol is blown through the mixture. Ethyl chloride is produced in good yields and at a high rate. While the solution is still acid I may stop the addition of alcohol and regenerate the original solution by saturating it with HCl gas to convert ferric hydroxide to hydrated ferric chloride. The solution is now ready to be again treated with alcohol with the formation of more ethyl chloride.

As examples of the wide range of acidity through which alcohol may be converted to ethyl chloride by means of ferric chloride in the presence of water, I append the two following records of experiments.

|  | 1 | 2 |
|---|---|---|
| $FeCl_3$ | 3880 grms.=56.5% | 2043 grms.=74.5% |
| $C_2H_5OH$ | 675 grms.= 9.9% | 460 grms.=16.7% |
| HCl | 794 grms.=11.6% | None. |
| $H_2O$ | 1501 grms.=22.0% | 240 grms. = 8.8% |
| Temp. distillation | 95–139° C. | 80–165° C. |

Run No. 1 was found to contain 1.3% free HCl after all the ethyl chloride had been driven off. In this case no sludge appeared as any $Fe(OH)_3$ formed was immediately reconverted to $FeCl_3$.

Run No. 2 contained no free HCl and the formation of $C_2H_5Cl$ resulted in the formation of an equivalent amount of sludge of basic iron compounds.

The following table shows the range in variation of percentages from which I have obtained satisfactory yields, and are given merely by way of example, but not to limit the scope of the invention:

| Alcohol | Water | Ferric chloride | Hydrochloric acid |
|---|---|---|---|
| 16 | 11 | 73 | 0 |
| 9.9 | 22 | 56.5 | 11.6 |
| 6.7 | 26.1 | 55 | 12.1 |
| 11 | 18.3 | 61 | 9 |
| 8.2 | 19.8 | 60.2 | 11.7 |

As long as the solution contains free hydrochloric acid, or excess of hydrated ferric chloride above the molecular proportions required for the reaction good yield continues to be obtained. The advantage of retaining free acid in the solution is that ferric hydrate sludge is regenerated as formed instead of stopping the entire reaction and using up the time necessary to regenerate all the sludge by treatment with free acid. As long as the solution contains hydrated ferric chloride in excess and none or very little ferric hydrate, peak yield continues. Hence, by adding free acid in substantial excess, as herein disclosed, the production in a given piece of equipment is lengthened.

I do not restrict myself to any definite proportions and temperatures except as required by the scope of the appended claims.

What I claim is:

1. The process of producing ethyl chloride comprising reacting ethyl alcohol, water and ferric chloride in proportions by weight of about 16 to 11 to 73 respectively.

2. The process of producing ethyl chloride which comprises passing ethyl alcohol into a heated solution of a hydrated ferric chloride and hydrochloric acid, collecting the evolved ethyl chloride, interrupting the addition of the alcohol while the solution is still acid, regenerating the original acidity of the mixture by passing in hydrochloric acid gas, and repeating the cycle.

3. Process comprising reacting between 16 and 6 parts of ethyl alcohol with between 11 and 22 parts of water, and between 73 and 55 parts of ferric chloride.

4. Process comprising reacting between 16 and 6 parts of ethyl alcohol with between 11 and 22 parts of water, and between 73 and 55 parts of ferric chloride, and up to 12 parts of hydrochloric acid.

5. Process of producing an alkyl chloride which comprises passing the corresponding alkyl alcohol into a heated solution of hydrated ferric chloride and hydrochloric acid, collecting the evolved alkyl chloride, interrupting the addition of the alcohol while the solution is acid, regenerating the original acidity of the mixture by passing in hydrochloric acid gas, and repeating the cycle.

6. Process consisting in reacting between 16 and 6 parts of alkyl alcohol with between 11 and 22 parts of water, and between 73 and 55 parts of ferric chloride.

7. Process consisting in reacting between 16 and 6 parts of alkyl alcohol with between 11 and 22 parts of water, and between 73 and 55 parts of ferric chloride, and up to 12 parts of hydrochloric acid.

8. In a process for the production of an alkyl chloride from the corresponding alcohol the step of passing said alcohol into a reaction medium comprising from 11 to 22 parts water and from 73 to 55 parts of ferric chloride.

9. Process of producing an organic chloride comprising reacting a solution comprising a primary alcohol, ferric chloride, and water, wherein the water comprises at least 8.8% of the entire mixture.

10. Process of producing an organic chloride comprising reacting a solution comprising a primary alcohol, ferric chloride, added hydrochloric acid, and water, wherein the water comprises at least 8.8% of the entire mixture.

11. A process of producing ethyl chloride comprising reacting a solution comprising ethyl alcohol, ferric chloride, and water, wherein the weight of the water is at least 12% that of the ferric chloride and that of the alcohol is less than that of the water.

Signed at Niagara Falls, in the county of Niagara and State of New York, this 26th day of December, 1924.

EARLE A. HARDING.